US008438120B2

(12) United States Patent
Raaijmakers

(10) Patent No.: US 8,438,120 B2
(45) Date of Patent: May 7, 2013

(54) MACHINE LEARNING HYPERPARAMETER ESTIMATION

(75) Inventor: Stephan Alexander Raaijmakers, Amsterdam (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 607 days.

(21) Appl. No.: 12/597,257

(22) PCT Filed: Apr. 25, 2008

(86) PCT No.: PCT/NL2008/050247
§ 371 (c)(1),
(2), (4) Date: Jul. 8, 2010

(87) PCT Pub. No.: WO2008/133509
PCT Pub. Date: Nov. 6, 2008

(65) Prior Publication Data
US 2010/0280979 A1    Nov. 4, 2010

(30) Foreign Application Priority Data

Apr. 25, 2007  (EP) .................................... 07106963
Jul. 9, 2007   (EP) .................................... 07112037

(51) Int. Cl.
*G06N 5/00*      (2006.01)
(52) U.S. Cl.
USPC ............................................. 706/12; 706/45
(58) Field of Classification Search .................. 706/12, 706/45
See application file for complete search history.

(56) References Cited

PUBLICATIONS

Duckstein, et al., Bayesian forecasting of hydrologie variables under changing climatology, the Influence of Climate Change and Climatic Variability on the Hydrologie Regime and Water Resources (Proceedings of the Vancouver Symposium, Aug. 1987). IAHSPubl. No. 168, 1987, pp. 301-311.*
Raaijmakers, "Sentiment classification with interpolated information diffusion kernels," Proceedings of the 1st International Workshop on Data Mining and Audience Intelligence for Advertising, pp. 34-39, (Aug. 12, 2007).
AMIDA Project: "Chapter 3: subjectivity recognition" Deliverable 5.2: Multimodal Content Abstraction, 2007, pp. 28-47.
De Boer et al., "A Tutorial on the Cross-Entropy Method," Annals of Operating Research, vol. 134, No. 1, (Feb. 2005), pp. 19-67.
Mannor et al., "The cross entropy method for classification," Proceedings of the 22nd International Conference on Machine Learning (Aug. 9, 2005) (the whole document).
International Search Report dated Oct. 9, 2008 for PCT/NL2008/050247.

* cited by examiner

*Primary Examiner* — Wilbert L Starks
(74) *Attorney, Agent, or Firm* — Leydig, Voit & Mayer, Ltd.

(57) ABSTRACT

A method of determining hyperparameters (HP) of a classifier (1) in a machine learning system (10) iteratively produces an estimate of a target hyperparameter vector. The method comprises the steps of selecting from the random sample the hyperparameter vector producing the best result in the present and any previous iterations, and updating the estimate of the target hyperparameter vector by using said selected hyperparameter vector. The random sample may be restricted by using the hyperparameter vector producing the best result in the present and any previous iterations.

16 Claims, 1 Drawing Sheet

MACHINE LEARNING HYPERPARAMETER ESTIMATION

FIELD OF THE INVENTION

The present invention relates to hyperparameter estimation. More in particular, the present invention relates to a method and device for determining hyperparameters of classifiers in machine learning systems and applications.

BACKGROUND

Classifiers are used in machine learning systems to classify physical objects and/or their (typically digital) representations. Machine learning systems may, for example, be used to assist fruit picking robots. The classifier of the machine learning system is trained to distinguish ripe fruit (e.g. tomatoes) from unripe fruit. For each fruit item, the classifier determines a set of parameters which are compared with stored parameters in order to classify the items as "ripe" or "unripe". The classification process is, in turn, controlled by hyperparameters which determine, for example, decision criteria such as threshold values.

Classifiers are typically trained using a training set prepared on the basis of human input: an operator indicates the correct classification for the items of the training set. On the basis of these training data, the correct hyperparameters of the classifier can be estimated.

Hyperparameters may be determined using various methods, for example heuristic or statistical optimisation methods. However, many heuristic methods are ad hoc methods, while not all statistical optimisation methods are suitable for determining hyperparameters.

A particularly efficient yet relatively simple method for estimating parameters in general is the cross-entropy (CE) method. This iterative method comprises the repeated steps of drawing, in a parameterised way, a random sample of candidate solutions, and updating the parameters on the basis of the random sample. At the time of writing, the paper "A Tutorial on the Cross-Entropy Method" by P. T. de Boer et al. could be found at http://iew3.technion.ac.il/CE/tutor.php, said paper is herewith incorporated in this document in its entirety.

The paper "The cross-entropy method for classification" by S. Mannor, D. Peleg and R. Rubinstein, Proceedings of the 22$^{nd}$ International Conference on Machine Learning, 2005, discloses an application of the CE algorithm for searching the space of support vectors. Hyperparameter values are determined by using a simple grid search, not by using the CE algorithm, for the reasons discussed below.

The cross-entropy method as described in the above-mentioned papers is unfortunately not suitable for determining hyperparameters. Determining optimal sets of hyperparameter values is a difficult problem due to the extremely large size of the search space: the optimal solution typically is a rare event. While the cross-entropy method is geared towards sampling rare event spaces, it is not a priori clear how the process of drawing hyperparameter values can be parameterised, as the hyperparameter samples are not classical parameterised probability density functions.

SUMMARY OF THE INVENTION

It is an object of the present invention to overcome these and other problems of the Prior Art and to provide a method and device for determining hyperparameters which allow efficient methods similar to the cross-entropy method to be utilized.

Accordingly, the present invention provides a method of determining hyperparameters of a classifier in a machine learning system by iteratively producing an estimate of a target hyperparameter vector, each iteration comprising the steps of:

drawing a random sample of hyperparameter vectors from a set of possible hyperparameter vectors, and updating the estimate of the target hyperparameter vector by using the random sample, the method being characterised in that each iteration comprises the step of:

selecting from the random sample a hyperparameter vector producing the best result in the present and any previous iterations, and in that the step of updating the estimate of the target hyperparameter vector involves said selected hyperparameter vector.

By selecting from the random sample a or the hyperparameter vector producing the best result in the present and any previous iterations, and using said selected hyperparameter vector to update the estimate of the target hyperparameter vector, the properties of the best performing hyperparameters are used to guide the next iteration. In this way, a method similar to the cross-entropy method can be used effectively for determining hyperparameters, even when the hyperparameters are not continuous and their effects are not transparent. By using the method according to the present invention, an improved classification accuracy is achieved.

In the method of the present invention, hyperparameter vectors obtained through randomly sampling a set of hyperparameter vectors are used to estimate a desired (that is, target) hyperparameter vector to be used in the classifier. Each hyperparameter vector preferably comprises two or more elements, that is hyperparameters, but it is also possible for a hyperparameter vector to contain only a single hyperparameter. Although the samples are preferably completely random, pseudo-random samples may be used instead.

In a preferred embodiment, the method according to the present invention further comprises the steps of:

selecting from the random sample a further hyperparameter vector producing the best result in any previous iterations, and restricting the random sample of hyperparameter vectors by using the further selected hyperparameter vector.

The step of restricting the random sample preferably involves the use of an interval surrounding the further selected hyperparameter vector which produces the best result in any previous iteration.

It is preferred that the step of restricting the random sample is carried out prior to the step of determining the hyperparameter vector producing the best result in the present and any previous iterations. However, in alternative embodiments, the step of restricting the random sample is carried out during the step of updating the estimate of the target hyperparameter vector.

In a preferred embodiment, $E^t$ is the hyperparameter vector $X^t_i$ at iteration t producing the best result $S(X^t_i)$ in the present iteration t and all previous iterations (if any). The random sample $X^t_i$ has elements $X^t_{ij}$, while the step of updating the hyperparameters comprises the step of determining the (target) hyperparameter $v^t_j$, where $$v^t_j = \frac{\sum_{i=1}^{n} I\{S(X^t_i) \geq \gamma^t\} W(X^t_i; E^t) X^t_{ij}}{\sum_{i=1}^{n} I\{S(X^t_i) \geq \gamma^t\} W(X^t_i; E^t)},$$

wherein $\gamma^t$ is a threshold value, W is a weighting function and $I\{S(X_i^t) \geq \gamma^t\}$ is an indicator function which is equal to 1 if $S(X_i^t)$ greater than or equal to the threshold value $\gamma^t$, and else is equal to 0. The weighting function W is preferably given by $$W(X^t_i; E^t) = 1 - \frac{\sqrt{\sum_{j=1}^{m}(X^t_{ij} - E^t_j)^2}}{\sqrt{\sum_{j=1}^{m}(X^t_{ij})^2}\sqrt{\sum_{j=1}^{m}(E^t_j)^2}}.$$

Accordingly, the step of updating the hyperparameters may involve a weighting function based upon a distance function, preferably a Euclidean distance function. It is noted that when the Euclidean distance between $E^t$ and $X^t_{ij}$ is zero, the weighting function W is equal to one.

The method according to the present invention is typically carried out by computer apparatus, for example a general purpose computer system comprising a processor and an associated memory, one part of the memory storing a software program for instructing the processor to carry out the method steps of the present invention, and another part of the memory storing data, said data comprising the hyperparameter values referred to above.

The present invention also provides a computer program product for carrying out the method as defined above. A computer program product may comprise a set of computer executable instructions stored on a data carrier, such as a CD or a DVD. The set of computer executable instructions, which allows a programmable computer to carry out the method as defined above, may also be available for downloading from a remote server, for example via the Internet.

The present invention additionally provides a classifier for use in a machine learning system, the classifier being arranged for using hyperparameters as control parameters, wherein the hyperparameters have been determined by the method according to any of the preceding claims. The classifier is preferably embodied in software, but may also be embodied in hardware, or in a combination of hardware and software.

The present invention still further provides a device for determining hyperparameters of a classifier in a machine learning system, the device comprising a processor arranged for iteratively producing estimates of a target hyperparameter vector, each iteration comprising the steps of:
drawing a random sample of hyperparameter vectors from a set of possible hyperparameter vectors, and
updating the estimate of the target hyperparameter vector by using the random sample,
the device being characterised in that the processor is arranged such that each iteration comprises the step of:
selecting from the random sample a hyperparameter vector producing the best result in the present iteration and any previous iterations, and in that the step of updating the estimate of the target hyperparameter vector involves said selected hyperparameter vector.

The processor may be arranged for carrying out the steps mentioned above by providing a suitable software program in the memory associated with the processor. Alternatively, or additionally, the processor may be designed specifically to carry out the steps mentioned above.

A machine learning system comprising a device as defined above and/or arranged for carrying out the method as defined above is also provided by the present invention. The machine learning system may comprise hardware and/or software components.

BRIEF DESCRIPTION OF THE DRAWINGS

The present invention will further be explained below with reference to exemplary embodiments illustrated in the accompanying drawings, in which.

DETAILED DESCRIPTION OF THE DRAWINGS

Figure 1:
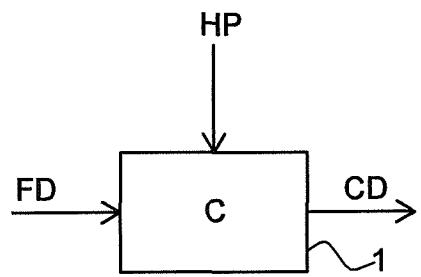
FIG. 1 schematically shows a classifier having hyperparameters as input control variables.
Figure 2:
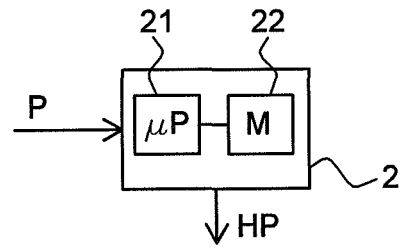
FIG. 2 schematically shows a device for determining hyperparameters according to the present invention.

The classifier (C) 1 shown schematically in FIG. 1 receives feature data FD and hyperparameters HP, and produces classification data CD. The feature data FD may include image data produced by a CCD (Charge Coupled Device) array or other light-sensitive device. Additionally, the feature data FD may include sound data or data concerning database items, such as library data (book numbers and titles). The classifier may be constituted by an apparatus (hardware embodiment), but is preferably constituted by a software program running on a computer apparatus, for example a general purpose computer ("personal computer"), a dedicated computer, or other suitable apparatus.

The classifier 1 is capable of classifying the items represented by the input feature data FD. The feature data FD typically comprise parameters of the items, for example their size and/or colour in the case of fruit or machine parts. Under control of the hyperparameters HP the items are each assigned to a class, for example "ripe" in the case of fruit. At least two different classes are used, and typically an item is assigned to one class only.

The hyperparameters HP determine the decision function of the classifier that classifies items. For example, when this function is based upon thresholding, items producing an aggregate value (derived from the feature values) equal to or greater than the threshold are assigned to class A, while items producing a value smaller than the threshold are assigned to class B. It is noted that other classification techniques may be used as well.

Applications of the classifier 1 include picking fruit, sorting parts (e.g. machine parts), classifying books, selecting songs, recognising adult video material, detecting damage, etc.

The present invention allows a method similar to the cross-entropy (CE) method to be used for estimating and determining hyperparameters. To this end, the present invention proposes to include a memory facility into the algorithm by preserving samples which produce a good result (the result being defined by a suitable function, such as a loss function). Additionally, or alternatively, the sampling of candidate hyperparameter settings is made dependent on the (hyper) parameter vector updated by the algorithm, and/or a suitably weighting function (also known as "change of measure" or "likelihood ratio" in the CE algorithm) guiding the search process should be provided.

The method of the present invention uses parameters N, ρ and μ which are typically predetermined. It is noted that these parameters may be thought of as hyperparameters of the method but are distinct from the hyperparameters to be determined by the method. The parameter N represents the number of random draws; the parameter N may for example be equal to 10, 100 or 1000.

In the iterations a parameter n is used which represents the size of each data vector, that is, the number of elements $X_{ij}$ of each hyperparameter vector $X_i$ of the set of possible hyperparameter vectors. The parameter n may for example be equal to 5, 10 or 100, although other numbers are also possible. The parameter ρ represents a fraction and may have a value ranging from 0.2 to 0.01, although other values may also be used. The width parameter μ, which will be explained in more detail below, indicates a preferred sampling interval.

The initial set of target hyperparameters, the hyperparameter vector u, can typically be chosen arbitrarily. Each estimated (target) hyperparameter vector $v^t$ at point in time (or iteration number) t consists of hyperparameters $v^t_j$.

In the present invention, the "best" hyperparameter vector v of iterations 1 ... t is kept for use in the next iteration and is denoted $E^t$. This "best" (or "elitist") hyperparameter vector is found using a function $S(X^t)$ which may be a loss function or any other suitable function producing a result value based upon $X^t$. The value of $S(X^t)$ may also be viewed as an importance measure. The value of $X^t$ corresponding with the maximum value of $S(X^t)$ is denoted argmax $S(X^t)$. In addition, the values of $S(X^t)$ are ranked and are used to determine a threshold $\gamma^t$, involving ρ and N to determine the $((1-\rho)N)^{th}$ value of the ranked values of $S(X^t)$. It is noted that the number $((1-\rho)N)$ is not necessarily an integer and is therefore rounded up, expressed mathematically as $\lceil((1-\rho)N)\rceil$.

Subsequently, the (target) hyperparameters are determined using an expression involving indicator functions $I\{S(X^t_i) \geq \gamma^t\}$ and weighting functions $W(X_i; E^t)$. The indication functions are equal to 1 when $S(X^t_i) \geq \gamma^t$ and equal to 0 when $S(X^t_i) < \gamma^t$. The weighting functions $W(X_i; E^t)$, also known as "change of measure" functions, have the data vector elements $X_i$ (actually $X^t_i$) and $E^t$ as input variables. This implies that the best data vector $E^t$ of the present iteration is used to determine the (target) hyperparameters.

The weighting function $W(X^t_i; E^t)$ is preferably defined as:

$$W(X_i^t; E^t) = 1 - \frac{\sqrt{\sum_{j=1}^{m}(X_{ij}^t - E_j^t)^2}}{\sqrt{\sum_{j=1}^{m}(X_{ij}^t)^2}\sqrt{\sum_{j=1}^{m}(E_j^t)^2}} \quad (1)$$

This function produces a value of 1 when the Euclidean distance between a sample and the "best" sample is 0.

Accordingly, a preferred embodiment of the method according to the present invention comprises the following steps:
1. Choose initial parameters N, ρ and μ and generate an initial (target) hyperparameter vector u.
2. Let $v^0 = E^0 = u$ and set iteration number t=1.
3. Generate a random sample $X^t_1, \ldots, X^t_n$ of hyperparameters drawn from a (given) set of possible hyperparameters. The random sample preferably is restricted by $v^{t-1}$. Compute the performance $S(X^t_i)$ for every value of i and rank the results: $S_{(1)} \leq \ldots \leq S_{(n)}$. Compute $\gamma^t = S_{percentile}$ and compute $E^t = \text{argmax } v_{i=1 \ldots n} \gamma^t$.
4. For every (target) hyperparameter $v^t_j$ let $$v_j^t = \frac{\sum_{i=1}^{n} I\{S(X_i^t) \geq \gamma^t\} W(X_i^t; E^t) X_{ij}^t}{\sum_{i=1}^{n} I\{S(X_i^t) \geq \gamma^t\} W(X_i^t; E^t)} \quad (2)$$

5. Let t:=t+1, repeat from step 3 until the stopping condition is met.

The final set v of j (target) hyperparameters $v_j$ is the desired optimal set.

By using the best sample $E^t_j$ in hyperparameter estimation/update formula (2), the better results are reinforced, leading to a more efficient convergence of the method. In addition, discontinuity problems associated with hyperparameters are overcome by the method of the present invention.

The stopping criterion (or condition) is preferably a non-changing value of the parameter $\gamma^t$ during a number of iterations, but could also be a threshold value. The value $S_{percentile}$ is determined using the $((1-\rho)N)^{th}$ value of S in the ranking $S_{(1)} \leq \ldots \leq S_{(n)}$, where rounding up may be used if this value is not an integer. The weighting function $W(X^t_i; E^t)$ used in formula (2) is preferably defined by formula (1) above.

The method of the present invention may be summarized as deriving a target hyperparameter vector from a random sample of hyperparameter vectors while taking the performance of the hyperparameters of the random sample into account.

The restriction which may be applied when generating a random sample at time t in step 3 may be defined by the interval:

$$[v_j^t*(1-\mu), v_j^t*(1+\mu)] \quad (3)$$

where μ is a width parameter and "*" denoted multiplication. If the sample $X^t_i$ lies within this interval, its distance relative to the best sample $E^t_j$ of the previous iteration is limited to the value of μ. It is noted that the use of this interval is preferred but not essential as the method of the present invention could be carried out without using this interval.

The device 2 for determining hyperparameters comprises a processor (μP) 21 and an associated memory (M) 22. The memory stores both instructions for the processor and data. The device 2 receives parameters P (more in general: feature data), such as the parameters ρ and μ mentioned above, and outputs hyperparameters HP. The stored instructions allow the processor to carry out the method according to the present invention.

Figure 3:
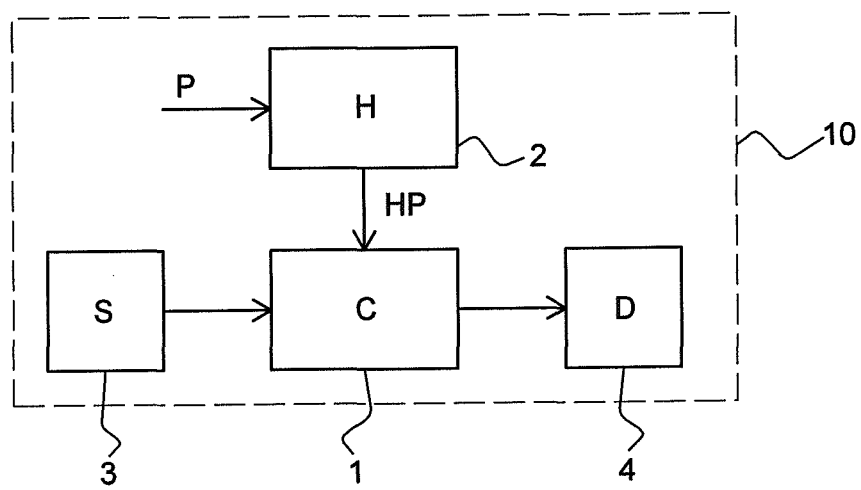
FIG. 3 schematically shows a machine learning system according to the present invention.

The machine learning system 10 shown merely by way of non-limiting example in FIG. 3 comprises a classifier (C) 1 and a device (H) 2 for determining hyperparameters. The machine learning system 10 may further comprise at least one sensor (S) 3 and a display screen (D) 4. The sensor 3 serves to collect data while the display screen 4 serves to display classification result and other data.

The present invention is based upon the insight that methods similar to the cross-entropy method can be adapted for hyperparameter estimation by adding a best performance preservation feature. The present invention benefits from the additional insight that the best performance in a particular iteration may be preserved by restricting the sample using the best performance of the previous iterations.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of determining hyperparameters of a classifier in a machine learning system by iteratively producing an estimate of a target hyperparameter vector, each iteration comprising the steps of:
   drawing a random sample of hyperparameter vectors from a set of possible hyperparameter vectors,
   updating the estimate of the target hyperparameter vector by using the random sample, and
   selecting, from the random sample of hyperparameter vectors, a hyperparameter vector producing a best result in the present and any previous iterations, and wherein the step of updating the estimate of the target hyperparameter vector uses said hyperparameter vector producing the best result.

2. The method according to claim 1, further comprising the steps of:
   selecting a further hyperparameter vector producing the best result in any previous iterations, and
   restricting the random sample of hyperparameter vectors by using the further selected hyperparameter vector.

3. The method according to claim 2, wherein the step of restricting the random sample of hyperparameter vectors involves using an interval surrounding the further selected hyperparameter vector.

4. The method according to claim 3, wherein the step of restricting the random sample of hyperparameter vectors is carried out prior to the step of selecting the hyperparameter vector producing the best result in the present and any previous iterations.

5. The method according to claim 3, wherein the step of restricting the random sample of hyperparameter vectors is carried out during the step of updating the estimate of the target hyperparameter vector.

6. The method according to claim 2, wherein the step of restricting the random sample of hyperparameter vectors is carried out prior to the step of selecting the hyperparameter vector producing the best result in the present and any previous iterations.

7. The method according to claim 2, wherein the step of restricting the random sample of hyperparameter vectors is carried out during the step of updating the estimate of the target hyperparameter vector.

8. The method according to claim 1, wherein the step of updating the estimate of the hyperparameter vector uses a weighting function.

9. The method according to claim 1, wherein $E^t$ is the selected hyperparameter vector $X^t_i$ at iteration t producing the best result $S(X^t_i)$, the selected hyperparameter vector $X^t_i$ having elements $X^t_{ij}$, wherein the step of updating the estimate of the target hyperparameter vector comprises the step of determining the hyperparameter $v^t_j$, where $$v^t_j = \frac{\sum_{i=1}^{n} I\{S(X^t_i) \geq \gamma^t\} W(X^t_i; E^t) X^t_{ij}}{\sum_{i=1}^{n} I\{S(X^t_i) \geq \gamma^t\} W(X^t_i; E^t)},$$

wherein $\gamma^t$ is a threshold value and W is a weighting function.

10. The method according to claim 9, wherein the weighting function W is given by $$W(X^t_i; E^t) = 1 - \frac{\sqrt{\sum_{j=1}^{m}(X^t_{ij} - E^T_j)^2}}{\sqrt{\sum_{j=1}^{m}(X^t_{ij})^2} \sqrt{\sum_{j=1}^{m}(E^t_j)^2}}.$$

11. The method according to claim 1, wherein the steps are carried out by a programmed computer apparatus including a processor and a computer readable medium including computer executable instructions.

12. A classifier for use in a machine learning system, the classifier using hyperparameters as control parameters, wherein the hyperparameters are determined according to the set of steps recited in claim 1.

13. A non-transitory computer readable medium product including computer-executable instructions for carrying out a method of determining hyperparameters of a classifier in a machine learning system by iteratively producing an estimate of a target hyperparameter vector, each iteration comprising the steps of:
   drawing a random sample of hyperparameter vectors from a set of possible hyperparameter vectors,
   updating the estimate of the target hyperparameter vector by using the random sample, and
   selecting, from the random sample of hyperparameter vectors, a hyperparameter vector producing a best result in the present and any previous iterations, and wherein the step of updating the estimate of the target hyperparameter vector uses said hyperparameter vector producing the best result.

14. A device for determining hyperparameters of a classifier in a machine learning system, the device comprising a processor arranged for iteratively producing an estimate of a target hyperparameter vector, each iteration comprising the steps of:
   drawing a random sample of hyperparameter vectors from a set of possible hyperparameter vectors,
   updating the estimate of the hyperparameter vector by using the random sample, and
   selecting, from the random sample of hyperparameter vectors, a hyperparameter vector producing a best result in the present and any previous iterations, and wherein the step of updating the estimate of the target hyperparameter vector uses said hyperparameter vector producing the best result.

15. The device according to claim 14, wherein the processor is further arranged for:
   selecting a further hyperparameter vector producing the best result in any previous iterations, and
   restricting the random sample by using the hyperparameter vector producing the best result in any previous iteration.

16. A machine learning system, comprising the device for determining hyperparameters of a classifier defined in claim 14.

* * * * *

UNITED STATES PATENT AND TRADEMARK OFFICE
CERTIFICATE OF CORRECTION

PATENT NO. : 8,438,120 B2  Page 1 of 1
APPLICATION NO. : 12/597257
DATED : May 7, 2013
INVENTOR(S) : Stephan Alexander Raaijmakers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Eighth Day of September, 2015

Michelle K. Lee
*Director of the United States Patent and Trademark Office*